United States Patent
Kimura et al.

(10) Patent No.: US 12,486,213 B2
(45) Date of Patent: Dec. 2, 2025

(54) METHOD OF PURIFYING CARBOXYLIC ACID FLUORIDE

(71) Applicant: KANTO DENKA KOGYO CO., LTD., Tokyo (JP)

(72) Inventors: Ryo Kimura, Gunma (JP); Akiko Nakanishi, Tokyo (JP); Shohei Maehara, Gunma (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 729 days.

(21) Appl. No.: 17/759,126

(22) PCT Filed: Jan. 22, 2021

(86) PCT No.: PCT/JP2021/002158
§ 371 (c)(1),
(2) Date: Jul. 20, 2022

(87) PCT Pub. No.: WO2021/149788
PCT Pub. Date: Jul. 29, 2021

(65) Prior Publication Data
US 2022/0402850 A1    Dec. 22, 2022

(30) Foreign Application Priority Data
Jan. 22, 2020   (JP) .................. 2020-008314

(51) Int. Cl.
*C07C 51/64*    (2006.01)

(52) U.S. Cl.
CPC .................. *C07C 51/64* (2013.01)

(58) Field of Classification Search
CPC ......... C07C 51/64; C07C 61/00; C07C 51/58; C07C 53/18
See application file for complete search history.

(56) References Cited

U.S. PATENT DOCUMENTS

| | | | |
|---|---|---|---|
| 4,400,532 A | 8/1983 | Lagow et al. | |
| 4,425,199 A | 1/1984 | Hamada et al. | |
| 4,623,491 A | 11/1986 | Siegemund et al. | |
| 5,672,748 A | 9/1997 | Ebmeyer et al. | |
| 7,423,174 B2 | 9/2008 | Irie et al. | |
| 8,308,850 B2 | 11/2012 | Olschimke et al. | |
| 2004/0158100 A1 | 8/2004 | Irie et al. | |
| 2011/0065955 A1 | 3/2011 | Metz et al. | |

FOREIGN PATENT DOCUMENTS

| | | |
|---|---|---|
| CN | 1121064 A | 4/1996 |
| JP | 1982164991 A | 10/1982 |
| JP | 1984177384 A | 10/1984 |
| JP | 1986010530 A | 1/1986 |
| JP | 1986110530 A | 1/1986 |
| JP | 2003054912 A | 2/2003 |
| JP | 4264689 B2 | 5/2009 |
| JP | 2011515354 A | 5/2011 |
| JP | 5473222 B2 | 4/2014 |

OTHER PUBLICATIONS

Schmidt et al., preparation method of carboxylic acid fluoride, DE 2460821 (machine translation), 1976.*
Lv et al., Purification method of high purity trifluoroacetyl halide, CN 104672080 abstract, Jun. 3, 2015.*
Clark et al., "Photochemical Reaction of Ozone with 2-Iodopropane and the Four Polyfluoroiodoethanes C2FsI, Cf3CH2I, Cf2HCf2I, and Cf3CFHI in Solid Argon at 14 K. FTIR Spectra of the Iodoso-Intermediates (Z-10), the Iodyl-Intermediates (Z-102), and the Various Complexes (CH3)2C=O—HI, Cf3C(O)H---XI, Cf2HC(O)F—IF, and Cf3C(O)F---XI (Where X=Hor F)",J. Phys. Chem. A, vol. 101, No. 49, (Sep. 1997), pp. 9260-9271.
ISR of PCT/JP2021/002158, dated Mar. 23, 2021.

* cited by examiner

Primary Examiner — Jafar F Parsa
(74) Attorney, Agent, or Firm — Dority & Manning, P.A.

(57) ABSTRACT

An object is to prevent lowering in the yield of R—COF due to contamination by impurities and thereby to produce a high-purity product of R—COF in a stable manner. According to the present invention, provided are: a method of purifying a carboxylic acid fluoride, comprising a step of removing a hydrogen halide by bringing a carboxylic acid fluoride containing the hydrogen halide into contact with a metal fluoride; a method of producing a high-purity carboxylic acid fluoride, comprising a step of bringing a carboxylic acid fluoride containing a hydrogen halide into contact with a metal fluoride as well as a high-purity carboxylic acid fluoride obtained therefrom; and a method of using a metal fluoride as an adsorbent for a hydrogen halide in a method of removing a hydrogen halide from a carboxylic acid fluoride containing the hydrogen halide.

16 Claims, 1 Drawing Sheet

*Retention time (RT) = 0.631 attributed to $N_2$
GC: SHIMADZU GC-8A
Detector: TCD
Column: PPQ (3 m)
Temperature conditions: 50°C → 200°C (5°C/min)

Top: $CF_3COF$ fragments
Bottom: $CF_3COF$-HCl complex fragments

METHOD OF PURIFYING CARBOXYLIC ACID FLUORIDE

TECHNICAL FIELD

The present invention relates to a method of purifying a carboxylic acid fluoride (R—COF where R is a monovalent organic group, a hydrogen atom, or a halogen atom). The present invention also relates to a high-purity R—COF and a production method therefor.

BACKGROUND ART

RCOF compounds (especially. $COF_2$) are known to be difficult to separate from hydrogen halides (especially, HF) through distillation and thus require considerable time and costs for purification. Patent Literature (PTL) 1 discloses that a gas mixture containing HF. HCl, and/or HBr as well as other components, in particular, a gas mixture containing a carboxylic acid fluoride, $COF_2$, or phosphorus pentafluoride as well as HCl and HF in some cases can be separated using one or more ionic liquids. However, the purification method of PTL 1 requires expensive ionic liquids and has a problem in which HCl remains in the order of percents in a purified product even after allowing to pass through an ionic liquid. PTL 2 discloses a process for separating an acid from a system in which the acid and an organic acid fluoride coexist, comprising using as a deacidifying agent an aromatic heterocyclic compound that has a boiling point of 50° C. or higher and that contains a nitrogen atom as a heteroatom. However, the process has a problem in which an aromatic heterocyclic compound is entrained in the gas flow to interfere with ultra-high purification through contamination.

Meanwhile, the existence of complexes between R—COF and hydrogen halides has been reported in some particular cases. For example, Non Patent Literature (NPL) 1 discloses a complex between $CH_3COF$ and HI. However, such complexes have rarely been reported, and hence, it is not considered that sufficient knowledge thereof has been accumulated.

CITATION LIST

Patent Literature

PTL 1: Japanese Patent No. 5473222 (Japanese Patent Application No. 2007-538309)
PTL 2: Japanese Patent No. 4264689 (Japanese Patent Application No. 2001-396680)

Non Patent Literature

NPL 1: J. Phys. Chem. A. Vol. 101, No. 49, 1997, pp. 9260-9271

SUMMARY OF INVENTION

Technical Problem

Through intensive studies, the present inventors successfully confirmed that R—COF and a hydrogen halide (HX) form a complex. Such a complex is represented by the formula of R—COF—HX (X=F, Cl, Br, I), for example. It is difficult to separate R—COF from such a complex. For this reason, R—COF—HX complex is incorporated into, for example, a product of the halogen exchange reaction below:

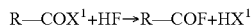

where R is a monovalent organic group, a hydrogen atom, or a halogen atom, and $X^1$ is a halogen atom excluding fluorine. Consequently, even if the synthetic yield before purification (crude yield) is high, a low R—COF yield after distillation (distillation yield) results (lowering in distillation yield) due to, for example, removal of the first fraction for removing impurities. Moreover, in the case of aiming at producing ultrahigh-purity R—COF of 5N purity (99.999% or more and less than 99.9999%) or higher, it was impossible to produce such ultrahigh-purity products by conventional purification methods (interference with ultra-high purification). In view of this, an object of the present invention is to prevent lowering in the yield of R—COF due to contamination by impurities and thereby to produce a high-purity product of R—COF in a stable manner.

Solution to Problem

As a result of the intensive studies, the present inventors found possible to decompose R—COF—HX complexes efficiently by using a metal fluoride as an adsorbent for a hydrogen halide, thereby attaining an increased yield and ultra-high purification of R—COF compounds. In other words, the present invention provides the following.

[1] A method of purifying a carboxylic acid fluoride, comprising a step of removing a hydrogen halide by bringing a carboxylic acid fluoride containing the hydrogen halide into contact with a metal fluoride.

[2] A method of producing a high-purity carboxylic acid fluoride, comprising a step of bringing a carboxylic acid fluoride containing a hydrogen halide into contact with a metal fluoride.

[3] A method of using a metal fluoride as an adsorbent for a hydrogen halide in a method of removing a hydrogen halide from a carboxylic acid fluoride containing the hydrogen halide.

[4] The method according to any of [1] to [3], where the carboxylic acid fluoride containing a hydrogen halide is a reaction product of a halogen exchange reaction below:

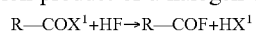

where R is a monovalent organic group, a hydrogen atom, or a halogen atom; and $X^1$ is a halogen atom excluding fluorine.

[5] The method according to any of [1] to [3], where the carboxylic acid fluoride containing a hydrogen halide is a reaction product in a reaction between a carboxylic acid chloride and a metal fluoride.

[6] The method according to any of [1] to [3], where the carboxylic acid fluoride containing a hydrogen halide is a reaction product in a reaction between a carboxylic acid chloride and chromium fluoride.

[7] The method according to any of [1] to [6], where the hydrogen halide is at least one selected from the group consisting of hydrogen fluoride and hydrogen chloride.

[8] The method according to any of [1] to [7], where the metal fluoride in the step of removing a hydrogen halide is sodium fluoride.

[9] The method according to any of [1] to [8], where the carboxylic acid fluoride is trifluoroacetyl fluoride.

[10] A carboxylic acid fluoride having a purity of 99.999% or more.

[11] Trifluoroacetyl fluoride having a purity of 99.999% or more.

Advantageous Effects of Invention

According to the present invention, it is possible to prevent lowering in the yield of R—COF due to contamination by impurities and thereby to produce a high-purity product of R—COF in a stable manner. In particular, according to the present invention, it has become possible to produce ultrahigh-purity R—COF of 5N purity (99.999% or more and less than 99.9999%) or higher, which was impossible to obtain by conventional purification methods. By using such ultrahigh-purity R—COF obtained by the present invention for semiconductor fabrication processes, it is possible to perform etching further precisely, thereby improving etching performance in the processes.

DESCRIPTION OF EMBODIMENTS

[Action]

Figure 1:
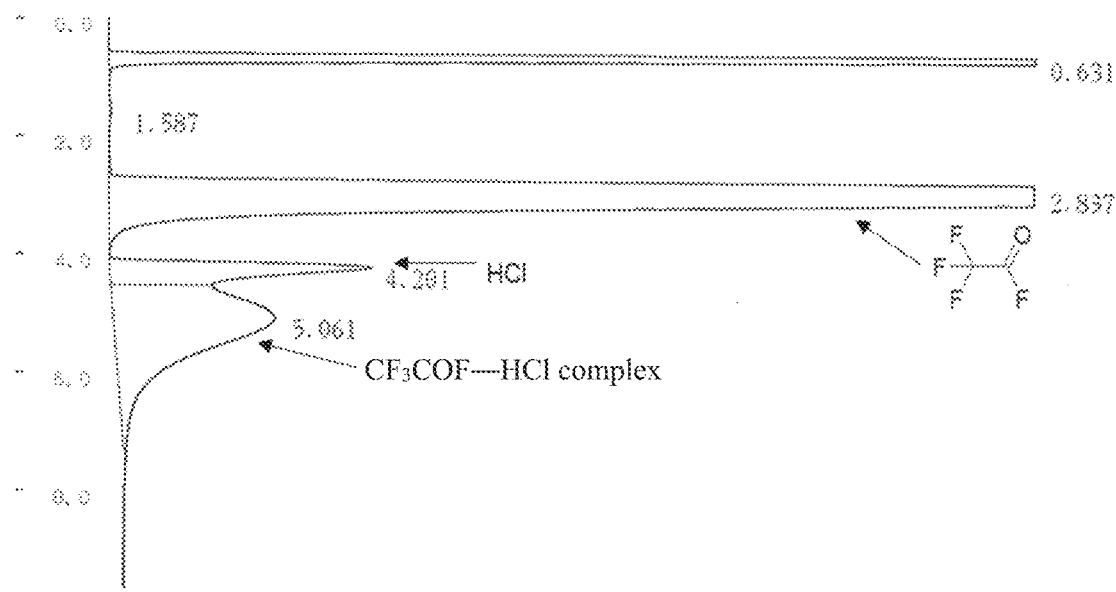
FIG. 1 shows a GC-TCD chart for a mixture of $CF_3COF$ and HCl.

In an attempt to obtain an ultrahigh-purity product of R—COF, the present inventors found as described hereinafter that R—COF forms a complex with a hydrogen halide and the complex makes it difficult to remove the hydrogen halide. In the Examples section described hereinafter, examples in which only distillation was performed exhibited a reduced distillation yield since the first fraction to be removed increased due to HCl, which is presumably released reversibly from $CF_3COF$—HCl complex. Moreover, ultra-high purification was impossible since $CF_3COF$—HCl complex could not be removed even after purification through distillation. Further, the time for removing the low-boiling fraction and for collecting the first fraction was prolonged for increasing the purity as high as possible, thereby lowering the productivity. Meanwhile, the present inventors found possible to prevent such formation of a complex by using a metal fluoride. According to the present invention, it is possible to avoid the conventionally proposed methods of using ionic liquids or aromatic heteroaromatic compounds for removing acid components from R—COF compounds. In addition, according to the present invention, it is possible to remove a hydrogen halide (especially, HCl or HF), which is difficult to separate from R—COF through distillation, by a relatively simple procedure of allowing to pass through a metal fluoride as an adsorbent for a hydrogen halide. Further, the present inventors found the presence of the above-described complexes and succeeded in removing such complexes, thereby making it possible to produce ultrahigh-purity R—COF of 5N purity or higher for the first time.

[Carboxylic Acid Fluorides (R—COF)]

The carboxylic acid fluoride as a target in the purification method of the present invention is represented by the formula of R—COF where R is a monovalent organic group, a hydrogen atom, or a halogen atom. Exemplary halogen atoms for R include fluorine (F), chlorine (Cl), bromine (Br), and iodine (I). Exemplary monovalent organic groups include alkyl groups having a carbon number of 1 to 6, especially, alkyl groups having a carbon number of 1 to 4, in particular, a methyl group, an ethyl group, a propyl group (particularly, n-propyl group, isopropyl group), a butyl group (particularly, n-butyl group, isobutyl group, tert-butyl group), and so forth; aryl groups (particularly, phenyl group, tolyl group); and arylalkyl groups (particularly, benzyl group, phenethyl group). The monovalent organic group may be substituted with a halogen atom, an alkoxy group, and so forth. Exemplary substituted organic groups include a difluoromethyl group; perfluoroalkyl groups, such as a trifluoromethyl group, a pentafluoroethyl group, and a heptafluoropropyl group; alkoxyalkyl groups, such as a methoxymethyl group; and alkoxyaryl groups, such as a methoxyphenyl group.

Further specific examples of the carboxylic acid fluoride include fluorides of carboxylic acids having a carbon number of 1 to 7, preferably fluorides of carboxylic acids having a carbon number of 2 to 7. Exemplary carboxylic acids having a carbon number of 1 to 7 include formic acid, acetic acid, propanoic acid, n-butanoic acid, isobutanoic acid, n-pentanoic acid, isopentanoic acid, neopentanoic acid, n-hexanoic acid, isohexanoic acid, neohexanoic acid, n-heptanoic acid, isoheptanoic acid, neoheptanoic acid, and combinations of these carboxylic acids. The hydrogen atoms on these carboxylic acids may be replaced by fluorine, and perfluorocarboxylic acid fluorides, in which all the hydrogen atoms are replaced by fluorine atoms, are preferable. Specific examples of such carboxylic acid fluorides include difluoroacetyl fluoride ($CHF_2COF$), trifluoroacetyl fluoride, perfluorobutyryl fluoride, and perfluoroheptanoyl fluoride.

[Metal Fluorides]

The metal fluoride as an adsorbent for a hydrogen halide is represented by the formula of $MF_n$, where M is a metal atom and n is the valence of the metal. Exemplary metal fluorides include alkali metal fluorides, alkaline earth metal fluorides, and transition metal fluorides. Two or more of these may be combined. Exemplary alkali metal fluorides include lithium fluoride, sodium fluoride, and potassium fluoride. Exemplary alkaline earth metal fluorides include magnesium fluoride, calcium fluoride, and barium fluoride. Exemplary transition metal fluorides include chromium fluoride, molybdenum fluoride, manganese fluoride, iron fluoride, cobalt fluoride, copper fluoride, nickel fluoride, zinc fluoride, and silver fluoride. As chromium fluoride, any of chromium(III) fluoride, chromium(VI) fluoride, and a mixture thereof may be used. As molybdenum fluoride, any of molybdenum(IV) fluoride, molybdenum(V) fluoride, molybdenum(VI) fluoride, and mixtures thereof may be used. As manganese fluoride, any of manganese(II) fluoride, manganese(III) fluoride, manganese(IV) fluoride, and mixtures thereof may be used. As iron fluoride, any of iron(II) fluoride, iron(III) fluoride, and a mixture thereof may be used. As cobalt fluoride, any of cobalt(II) fluoride, cobalt(III) fluoride, and a mixture thereof may be used. As copper fluoride, any of copper(I) fluoride, copper(II) fluoride, and a mixture thereof may be used. As for nickel fluoride and zinc fluoride, the divalent metal fluorides exist in a stable manner. As silver fluoride, any of silver(I) fluoride, silver(II) fluoride, silver(III) fluoride, and mixtures thereof may be used. In view of costs and convenience, alkali metal fluorides, such as sodium fluoride and potassium fluoride, are particularly preferable.

In addition to the use as powder, the metal fluoride may be used in the form of pellets (cylindrical, particle size of 0.5 to 30 mm, for example), honeycombs, particulates (spindle-shaped, particle size of 0.5 to 30 mm, for example), spheres (particle size of 0.5 to 30 mm, for example), and other aggregates excluding powder, for example. As an advantage of the use in the form other than powder is, for example, that the problem of forming flow channels of a raw material gas due to solidification of a metal fluoride and thereby lowering reaction efficiency is less likely to arise. The filling ratio of a metal fluoride in a reactor is preferably 30 volume % or more, more preferably 33 volume % or more, and most preferably 60 volume % or more. Since a shaped metal fluoride (pellets, for example) typically has pores or voids, it is possible to allow a gas to pass therethrough even at a filling ratio of 100 volume %.

[Purification Method]

The purification method of the present invention comprises a step of removing a hydrogen halide by bringing a carboxylic acid fluoride containing the hydrogen halide into contact with a metal fluoride. Specifically, it is possible to obtain a high-purity product, for example, by allowing a carboxylic acid fluoride (R—COF) containing a hydrogen halide (HX) to pass through a column filled with a metal fluoride to decompose a complex between R—COF and HX present together with the carboxylic acid fluoride and further by purifying through distillation the R—COF gas separated from HX. The temperature of such a packed column during purification is preferably 15° C. to 35° C. and most preferably room temperature (especially, 10° C. to 30° C.). A hydrogen halide attached to a metal fluoride can be removed by drying in a nitrogen atmosphere at a high temperature. Through this procedure, it is possible to regenerate and use a metal fluoride repeatedly.

An example of the column filled with a metal fluoride is a cylindrical tube that is equipped with a temperature controller for adjusting the purification temperature (also used as a heater during drying operation or during regeneration of a metal fluoride) and that is filled with a metal fluoride of various shapes and configured to allow a raw material gas to flow from one end to the other end of the tube. As for the direction in which a raw material gas is allowed to flow in the case of placing a cylindrical tube filled with a metal fluoride to extend in the vertical direction, the direction from the top to the bottom is preferable since the raw material gas can be allowed to flow little by little uniformly by exploiting the gravity. Meanwhile, in the case of placing a cylindrical tube to extend in the vertical direction and allowing a raw material gas to flow therethrough from the bottom to the top, it is desirable in view of adsorption efficiency to dispose metal fluoride pellets having a large particle size in the lower portion of the cylindrical tube and to dispose metal fluoride powder having a small particle size in the upper portion of the cylindrical tube. Exemplary materials of a reaction apparatus include corrosion-resistant metals, such as stainless steel, Inconel, Monel, Hastelloy, and nickel. Among these, stainless steel and nickel are preferable in view of corrosion resistance.

Particularly preferable examples of the object to be purified are as follows.

(1) One example is a mixture of R—COF and HX$^1$, which is a reaction product of the halogen exchange reaction of the formula below:

R—COX$^1$+HF→R—COF+HX$^1$ where R is a monovalent organic group, a hydrogen atom, or a halogen atom, and X$^1$ is a halogen atom excluding fluorine.

Here, since the reaction product also contains unreacted HF, the objects to be purified are actually R—COF and HX.

(2) Another example is a reaction product in a reaction between a carboxylic acid chloride and a metal fluoride. Examples of the carboxylic acid chloride include the compounds (R—COCl) in which the —COF moiety of the above-mentioned carboxylic acid fluorides (R—COF) is replaced by —COCl, and examples of the metal fluoride include the above-mentioned compounds. Specific examples include a reaction product in a reaction between a carboxylic acid chloride and chromium fluoride as represented by the formula below:

3R—COCl+CrF$_3$→3R—COF+CrCl$_3$.

In this reaction, since Cl involved in the reaction is removed as CrCl$_3$, HCl does not exist in the reaction system theoretically, and hence, the above-described complex is not supposed to be formed therein. However, small amounts of HF and HCl actually exist in the reaction system. The reason is that HCl is formed as a by-product since HF is used for regenerating CrF$_3$, from CrCl$_3$ formed by the reaction, as in the formula below:

CrCl$_3$+HF→CrF$_3$+HCl.

The thus-regenerated CrF$_3$ is used again as a reactant for the synthesis of R—COF. Here, Cr may be used by being supported on activated carbon. In the case of using as a supported catalyst like this, it is considered that the fluorinating agent (HF) used for the regeneration reaction, HCl as a by-product, and so forth further readily remain within activated carbon through adsorption.

(3) Another example is a reaction product in a method of producing CF$_3$COF through photooxidation of CF$_3$CHClF. For example, CF$_3$CHClF is irradiated with UV using a UV lamp and oxidized for the synthesis. On this occasion, oxygen as a reactant and Cl$_2$ (catalytic amount) as a radical initiator are added thereto. The reaction formula is as follows.

2CF$_3$CHClF+O$_2$→2CF$_3$COF+2 HCl

As in the formula, HCl is present in the crude product after the reaction.

(4) Another example is a reaction product in a method of producing CF$_3$COF through oxidation and thermal decomposition of CF$_3$CF=CF$_2$. For example, O$_2$ as a reactant and AgNO$_3$ and/or Ag$_2$O as a catalyst are used therefor. The thermal decomposition temperature is about 250° C., and the reaction formula is as follows.

CF$_3$CF=CF$_2$+O$_2$→CF$_3$COF+COF$_2$

This method through thermal decomposition tends to generate impurities, such as a hydrogen halide, in the crude product due to moisture incorporated into the reaction system.

(5) Regardless of the synthetic method, R—COF is intrinsically extremely susceptible to hydrolysis and hence readily incorporates HF (hydrogen halide) through chronological changes. When a complex is formed between a hydrogen halide generated through such chronological changes and R—COF, ultra-high purification of R—COF is impossible by conventional methods. The present specification describes, as an exemplary object particularly difficult to separate, a mixture of CF$_3$COF and HCl and/or HF.

[Ultrahigh-Purity R—COF and Production Method Therefor]

By employing the purification method of the present invention, it is possible to produce an ultrahigh-purity carboxylic acid fluoride of 99.999% or more in purity. It has been impossible to obtain such an ultrahigh-purity carboxylic acid fluoride even through precise distillation since a complex between a carboxylic acid fluoride and a hydrogen halide cannot be separated therefrom. In the present invention, an ultrahigh-purity carboxylic acid fluoride of 99.999% or more in purity has been realized by performing first the step of bringing a carboxylic acid fluoride containing such a complex into contact with a metal fluoride (step of allowing to pass through a column filled with a metal fluoride, for example) and then removing, through distillation, other impurities from the resulting purified carboxylic acid fluoride, from which the complex difficult to separate has already been removed. The order of allowing to pass through a column filled with a metal fluoride and a distillation column is not particularly limited and may also be the order of allowing to pass through a distillation column first and then pass through a column filled with a metal fluoride.

[Uses of Ultrahigh-Purity R—COF]

An ultrahigh-purity R—COF produced by the present invention does not substantially contain impurities and hence enables precise chemical reactions in semiconductor fabrication processes, such as etching and deposition at the atomic layer level.

EXAMPLES

[Confirmation of $CF_3COF$—HCl Complex Formation]

Figure 2:
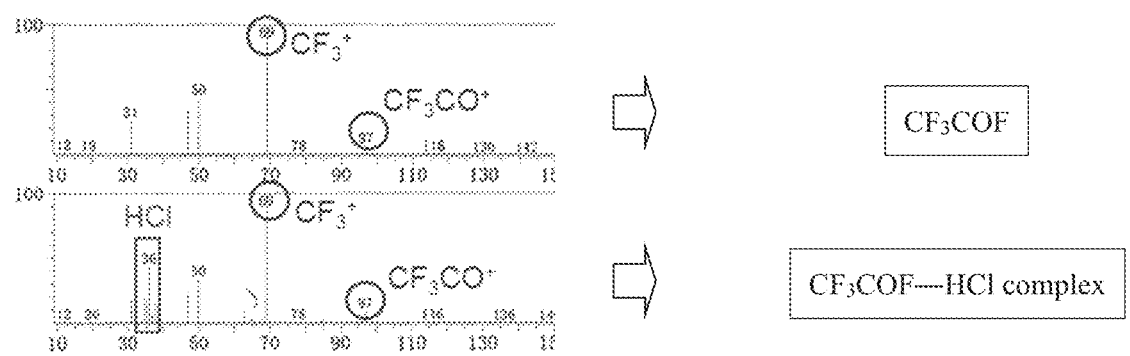
FIG. 2 shows a separately obtained GC-MS chart for $CF_3COF$ alone (top) and a GC-MS chart for the peak neighboring the HCl peak in FIG. 1 (bottom).

The present inventors found that $CF_3COF$—HCl complex is formed when $CF_3COF$ comes into contact with HCl. FIG. 1 shows a GC-TCD chart for a mixture of $CF_3COF$ and HCl. Moreover, FIG. 2 shows a separately obtained GC-MS chart for $CF_3COF$ alone (top) and a GC-MS chart for the peak neighboring the HCl peak in FIG. 1 (bottom). In FIG. 2, the peak neighboring the HCl peak in FIG. 1 shows a spectrum in which the separately obtained GC-MS chart for $CF_3COF$ (top) is added with a peak of 36 in molecular weight, which corresponds to HCl. Accordingly, it was confirmed that the peak neighboring the HCl peak in FIG. 1 is attributed to an associate (complex) between $CF_3COF$ and HCl.

Example 1

A stainless steel reactor tube having at the bottom a perforated metal for preventing falling of NaF pellets was filled with NaF pellets (size of 3 mmø×3 mm in cylindrical shape, bulk density of 1.55 g/cm³) to prepare a column filled with an adsorbent (hereinafter, referred to as "NaF column"). The conditions for the NaF column are shown in Table 1, and the removal performance of HF and HCl by the NaF column is shown in Table 2.

TABLE 1

| | Feed gas (object to be purified) | Crude gas from fixed bed reactor |
|---|---|---|
| Amount to be fed | | 4,661 kg/hr |
| Residence time T1 = V/F | | 0.02 min |
| Filler | NaF pellet weight | 1,500 g |
| | Drying method | 300° C., 5 L/min $N_2$ |

In Table 1 above, the residence time T1 is V/F, which represents the total volume (L) of a gas that has passed through the column/flow velocity (L/min).

TABLE 2

Results of HCl and HF Removal through NaF Column (unit: ppm)

| | Crude gas sample 1 from fixed bed reactor | | Crude gas sample 2 from fixed bed reactor | |
|---|---|---|---|---|
| | HF | HCl | HF | HCl |
| Without allowing to pass through NaF | 607 | 70 | 891 | 132 |
| Flow rate of 50 L/min | 17 | <2 | 31 | <2 |

From Tables 1 and 2, it was confirmed that NaF pellets are capable of adsorbing HF and HCl.

The feed gas (object to be purified) is a reaction product (crude gas from fixed bed reactor) prepared by the following method.

Method of Producing Trifluoroacetyl Fluoride ($CF_3COF$) Using $CrF_3/C$:

A SUS wool was disposed at the bottom of a 2B vertical SUS reactor, and the reactor was filled with 17 to 33 mass % of $CrF_3$ supported on C ($CrF_3/C$) on the SUS wool. The reactor was heated to 200° C. to 350° C., and trifluoroacetyl chloride ($CF_3COCl$ (TFAC)) was allowed to flow therethrough. The formation of $CF_3COF$ was confirmed by GC analysis of the outlet gas. A 500 mL cylinder was cooled with liquid nitrogen to trap the formed $CF_3COF$. HCl and HF were present in the $CF_3COF$ gas as the reaction product.

The three gases below containing R—COF—HX complex prepared using the $CF_3COF$ gas described above were analyzed by GC and FT-IR.

(1) a distillate of a mixed product of $CF_3COF$ and HCl (1:1 molar ratio) (the case without allowing to pass through the NaF column before distillation)

(2) a distillate of a mixed product of $CF_3COF$ and HCl (about 1000 ppm) (the case without allowing to pass through the NaF column above before distillation)

(3) a distillate of a mixed product of $CF_3COF$ and HCl (about 1000 ppm) (the case of allowing to pass through the NaF before distillation)

The tests were performed while controlling a gas flow rate using a mass flow controller (MFC) when allowing each gas to pass through.

(Conditions for Allowing to Pass Through NaF Column)

A cylindrical stainless steel reactor having at the bottom a perforated metal for preventing falling of NaF pellets was filled with NaF pellets (size of 3 mmø×3 mm in cylindrical shape, bulk density of 1.55 g/cm³) at a filling ratio of 66.5 volume % and placed vertically. Each gas was allowed to pass through the reactor from the top to the bottom under the conditions below and further fed to a distillation column in the next step.

Temperature: 15° C. to 35° C.

Pressure: 0 to 0.2 MPaG (gauge pressure)

Flow rate: 2 to 4 kg/hr (Distillation Conditions)

Pot/column top pressure: 0 to 0.2 MPaG (gauge pressure)

Pot/column top temperature: −40° C. to −100° C.

Withdrawal flow rate: 0.1 to 2 kg

The results are shown in Tables 3 to 5.

TABLE 3

① Example without allowing to pass through NaF column before distillation for mixed product of CF$_3$COF and HCl (1:1 molar ratio)

| Fraction | weight g | GC peak area % | | | |
|---|---|---|---|---|---|
| | | CF$_3$COF | HCl | CF$_3$COF-HCl complex | HF |
| Feed | 577 | 42.5601 | 21.1113 | 20.1736 | 14.4977 |
| First fraction | 175 | 49.0506 | 47.2747 | 0.0000 | 1.5210 |
| Main fraction (1N) | 42 | 97.7559 | N.D. | 0.3837 | 1.2027 |
| Latter fraction 1 | 71 | 58.6100 | 10.3859 | 15.8290 | 8.5914 |
| Latter fraction 2 | 195 | 36.8729 | 14.6002 | 22.2450 | 23.9771 |
| Pot residue | 48 | 21.0121 | N.D. | 29.1652 | 46.0518 |

Each fraction in the table is defined as follows.
First fraction: a fraction containing HCl before the main fraction (fraction with high content of low-boiling substances)
Main fraction: a fraction of 90% or more and less than 99% in purity (1N)
Latter fractions: fractions containing HCl after the main fraction (fractions with high content of high-boiling substances)
Pot residue: a fraction that is impossible to collect as a latter fraction by normal operation and is taken out through heating of the column or the like (fraction with high content of high-boiling substances)
In the table, "N.D." indicates "not detected."

As shown, as much as 175 g of first fraction was required to remove HCl. Moreover, the main fraction was contaminated with CF$_3$COF—HCl complex since CF$_3$COF was unable to be separated from CF$_3$COF—HCl complex. Consequently, the purity reached just 1N (purity of 90% or more and less than 99%) without attaining high purification. When the HCl concentration is high during feeding, latter fractions are also contaminated with HCl. Such HCl contained in the latter fractions is presumably released from the complex.

TABLE 4

② Example without allowing to pass through NaF column before distillation for mixed product of CF$_3$COF and HCl (about 1000 ppm)

| Fraction | weight kg | GC peak area % CF$_3$COF | FT-IR ppm HF | FT-IR ppm HCl |
|---|---|---|---|---|
| Feed | 94.50 | 99.6321 | 130 | 1020 |
| Low-boiling fraction | 1.53 | N.D. | 130 | 7000 |
| First fraction | 29.90 | 99.9558 | 60 | 45 |
| Main fraction | 33.42 | 99.9888 | 50 | 10 |
| Pot residue | 9.62 | 99.3751 | 31 | 57 |

Each fraction in the table is defined as follows.
First fraction: a fraction of 99.9% or more and less than 99.99% in purity before the main fraction (fraction with high content of low-boiling substances)
Main fraction: a fraction of 99.9% or more and less than 99.99% in purity
Latter fraction: a fraction of less than 99.9% in purity after the main fraction (fraction with high content of high-boiling substances); such a fraction corresponding to the latter fraction was not obtained.
Pot residue: a fraction that is impossible to collect as a latter fraction by normal operation and is taken out through heating of the column or the like (fraction with high content of high-boiling substances)
In the table, "N.D." indicates "not detected."

The main fraction had 3N (99.9888%) in actual purity, which takes into account the gases (N$_2$+CO) that were difficult to remove through distillation, and the purity was converted to 4N (99.99% or more and less than 99.999%) without taking into account (N$_2$+CO). However, it was still impossible to obtain a high-purity product of 5N (99.999% or more and less than 99.9999%). Moreover, as much as 29.9 kg of first fraction was required to collect due to HCl presumably released from CF$_3$COF—HCl complex. Consequently, the purity of 5N or higher was not attained through distillation, and the productivity (the amount of main fraction) decreased due to prolonged time for removing the low-boiling fraction and for collecting the first fraction.

TABLE 5

③ Example of allowing to pass through NaF column before distillation for mixed product of CF$_3$COF and HCl (about 1000 ppm)

| Fraction | weight kg | GC peak area % CF$_3$COF | FT-IR ppm HF | FT-IR ppm HCl |
|---|---|---|---|---|
| Feed 1 | 125 | 98.0906 | 1.5 | N.D. |
| Feed 2 | 25 | 99.9888 | 0.5 | N.D. |
| Feed 3 | 18 | 99.9558 | 0.5 | N.D. |
| Low-boiling fraction | 1 | 80.5398 | 2 | N.D. |
| First fraction | 8 | 99.8924 | 7 | N.D. |
| Main fraction | 107 | 99.9997 | N.D. | N.D. |
| Pot residue | 10 | 99.7648 | 190 | N.D. |

The feed gas was introduced into the distillation column in three batches before starting distillation (Feed 1 to 3).
Each fraction in the table is defined as follows.
First fraction: a fraction of 3N purity (purity of 99.9% or more and less than 99.99%) before the main fraction (fraction with high content of low-boiling substances)
Main fraction: a fraction of 5N purity (purity of 99.999% or more and less than 99.9999%)
Latter fraction: a fraction corresponding to the latter fraction was not obtained since a large quantity of main fraction was collected.
Pot residue: a fraction that is impossible to collect as a latter fraction by normal operation and is taken out through heating of the column or the like (fraction with high content of high-boiling substances)
In the table, "N.D." indicates "not detected."

As shown, ultra-high purification was attained through distillation since CF$_3$COF—HCl complex was decomposed by allowing to pass through the NaF column before distillation and thus high-purity CF$_3$COF, in which HCl had not been detected, was distilled.

Table 3 reveals that the presence of CF$_3$COF—HCl complex not only increases the first fraction to be removed while lowering the productivity but also makes it difficult to attain high purification of CF$_3$COF through distillation. Table 4 reveals that even a trace amount of HCl requires, due to the formation of CF$_3$COF—HCl complex and HCl released therefrom, a considerable amount of first fraction to be removed and makes it difficult to attain ultra-high purification of CF$_3$COF. Meanwhile, Table 5 reveals that by bringing a gas containing CF$_3$COF—HCl complex into contact with NaF, the complex which is difficult to separate through distillation was decomposed to reduce the first fraction to be removed while increasing the productivity and further to attain ultra-high purification of CF$_3$COF. The example of the present invention attained the CF$_3$COF purity exceeding 99.999% in the main fraction.

The invention claimed is:

1. A method of purifying a carboxylic acid fluoride, comprising a step of removing a hydrogen halide by bringing a carboxylic acid fluoride containing the hydrogen halide into contact with a metal fluoride,
   wherein the step of removing a hydrogen halide comprises passing the carboxylic acid fluoride containing the hydrogen halide through a column filled with a metal fluoride, and then distilling the carboxylic acid fluoride passed through the column, to obtain a carboxylic acid fluoride having a purity of 99.999% or more,
   wherein the metal fluoride is sodium fluoride, and
   wherein the carboxylic acid fluoride is at least one selected from the group consisting of difluoroacetyl fluoride (CHF$_2$COF), trifluoroacetyl fluoride, perfluorobutyryl fluoride, and perfluoroheptanoyl fluoride.

2. A method of producing a carboxylic acid fluoride having a purity of 99.999% or more, comprising a step of bringing a carboxylic acid fluoride containing a hydrogen halide into contact with a metal fluoride,
   wherein the step of bringing a carboxylic acid fluoride comprises passing the carboxylic acid fluoride containing the hydrogen halide through a column filled with a metal fluoride, and then distilling the carboxylic acid fluoride passed through the column, to obtain a carboxylic acid fluoride having a purity of 99.999% or more,
   wherein the metal fluoride is sodium fluoride, and
   wherein the carboxylic acid fluoride is at least one selected from the group consisting of difluoroacetyl fluoride (CHF$_2$COF), trifluoroacetyl fluoride, perfluorobutyryl fluoride, and perfluoroheptanoyl fluoride.

3. A method of using a metal fluoride as an adsorbent for a hydrogen halide in a method of removing a hydrogen halide from a carboxylic acid fluoride containing the hydrogen halide,
   wherein the method of removing a hydrogen halide comprises passing the carboxylic acid fluoride containing the hydrogen halide through a column filled with a metal fluoride, and then distilling the carboxylic acid fluoride passed through the column, to obtain a carboxylic acid fluoride having a purity of 99.999% or more,
   wherein the metal fluoride is sodium fluoride, and
   wherein the carboxylic acid fluoride is at least one selected from the group consisting of difluoroacetyl fluoride (CHF$_2$COF), trifluoroacetyl fluoride, perfluorobutyryl fluoride, and perfluoroheptanoyl fluoride.

4. The method according to claim 1, wherein the carboxylic acid fluoride containing a hydrogen halide is a reaction product of a halogen exchange reaction below:

$$R—COX^1 + HF \rightarrow R—COF + HX^1$$

wherein R is a monovalent organic group, a hydrogen atom, or a halogen atom; and X$^1$ is a halogen atom excluding fluorine.

5. The method according to claim 1, wherein the carboxylic acid fluoride containing a hydrogen halide is a reaction product in a reaction between a carboxylic acid chloride and a metal fluoride.

6. The method according to claim 1, wherein the carboxylic acid fluoride containing a hydrogen halide is a reaction product in a reaction between a carboxylic acid chloride and chromium fluoride.

7. The method according to claim 1, wherein the hydrogen halide is at least one selected from the group consisting of hydrogen fluoride and hydrogen chloride.

8. The method according to claim 1, wherein the carboxylic acid fluoride is trifluoroacetyl fluoride.

9. The method according to claim 2, wherein the carboxylic acid fluoride containing a hydrogen halide is a reaction product of a halogen exchange reaction below:

$$R—COX^1 + HF \rightarrow R—COF + HX^1$$

wherein R is a monovalent organic group, a hydrogen atom, or a halogen atom; and X1 is a halogen atom excluding fluorine.

10. The method according to claim 2, wherein the carboxylic acid fluoride containing a hydrogen halide is a reaction product in a reaction between a carboxylic acid chloride and a metal fluoride.

11. The method according to claim 2, wherein the carboxylic acid fluoride containing a hydrogen halide is a reaction product in a reaction between a carboxylic acid chloride and chromium fluoride.

12. The method according to claim 2, wherein the hydrogen halide is at least one selected from the group consisting of hydrogen fluoride and hydrogen chloride.

13. The method according to claim 3, wherein the carboxylic acid fluoride containing a hydrogen halide is a reaction product of a halogen exchange reaction below:

$$R—COX^1 + HF \rightarrow R—COF + HX^1$$

wherein R is a monovalent organic group, a hydrogen atom, or a halogen atom; and X1 is a halogen atom excluding fluorine.

14. The method according to claim 3, wherein the carboxylic acid fluoride containing a hydrogen halide is a reaction product in a reaction between a carboxylic acid chloride and a metal fluoride.

15. The method according to claim 3, wherein the carboxylic acid fluoride containing a hydrogen halide is a reaction product in a reaction between a carboxylic acid chloride and chromium fluoride.

16. The method according to claim 3, wherein the hydrogen halide is at least one selected from the group consisting of hydrogen fluoride and hydrogen chloride.

* * * * *